United States Patent
Kuchipudi

(10) Patent No.: US 10,649,477 B2
(45) Date of Patent: May 12, 2020

(54) PROGRAMMABLE SHUNT REGULATOR

(71) Applicant: Cypress Semiconductor Corporation, San Jose, CA (US)

(72) Inventor: Pavan Kumar Kuchipudi, San Jose, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 15/708,356

(22) Filed: Sep. 19, 2017

(65) Prior Publication Data

US 2018/0335792 A1   Nov. 22, 2018

Related U.S. Application Data

(60) Provisional application No. 62/508,100, filed on May 18, 2017.

(51) Int. Cl.
| | | |
|---|---|---|
| *G05F 1/56* | (2006.01) | |
| *G06F 1/26* | (2006.01) | |
| *H02M 7/06* | (2006.01) | |
| *H02M 3/335* | (2006.01) | |

(52) U.S. Cl.
CPC .............. *G05F 1/562* (2013.01); *G06F 1/266* (2013.01); *H02M 3/335* (2013.01); *H02M 7/06* (2013.01)

(58) Field of Classification Search
CPC . G05F 1/56; G05F 1/575; G05F 1/562; G05F 1/563; G05F 1/577; G05F 1/59; G05F 1/565; G05F 1/595; G05F 1/573; G05F 1/569; G05F 1/5735; G05F 3/24; G06F 1/266; H02M 7/06; H02M 3/335

USPC ................................................ 323/265–281
See application file for complete search history.

(56) References Cited

U.S. PATENT DOCUMENTS

| | | |
|---|---|---|
| 6,518,738 B1 | 2/2003 | Wang |
| 6,989,659 B2 | 1/2006 | Menegoli et al. |
| 7,294,993 B2 | 11/2007 | Clavette et al. |
| 8,089,783 B2 | 1/2012 | Tao et al. |

(Continued)

FOREIGN PATENT DOCUMENTS

WO    2011107976 A1   9/2011

OTHER PUBLICATIONS

"DAC Programmable CCFL Switching Regulator (Bits-to-Nits)," Linear Technology Corporation, LT1186F, pp. 1-16; 16 pages.

(Continued)

*Primary Examiner* — Adolf D Berhane
*Assistant Examiner* — Kevin H Sprenger

(57) ABSTRACT

A device and method that includes a shunt regulator of a universal serial bus (USB) compatible power supply device is disclosed. The shunt regulator includes an amplifier with an output, a first input, and a second input. The shunt regulator also includes a current digital-to-analog converter (DAC) that is coupled to the first input of the amplifier and a voltage bus node. The current DAC adjusts a sink or a source current delivered at the first input of the amplifier to regulate a programmable output voltage (Vbus) in the USB-compatible power supply device. The current delivered by the DAC is responsive to receipt of a digital code indicative of a programmable power supply command specifying the Vbus to be delivered by the USB-compatible power supply device on the voltage bus node.

15 Claims, 4 Drawing Sheets

(56) References Cited

U.S. PATENT DOCUMENTS

| | | | | |
|---|---|---|---|---|
| 8,102,679 | B2* | 1/2012 | Gong | H02M 3/156 |
| | | | | 363/21.04 |
| 8,255,733 | B1* | 8/2012 | Bartel | G06F 1/10 |
| | | | | 331/10 |
| 8,305,056 | B2 | 11/2012 | Wadhwa | |
| 9,236,806 | B2 | 1/2016 | Yang et al. | |
| 9,362,834 | B2 | 6/2016 | Tang et al. | |
| 9,448,575 | B2 | 9/2016 | Mai et al. | |
| 9,473,027 | B2* | 10/2016 | Dong | H02M 3/157 |
| 9,804,619 | B2* | 10/2017 | Motoki | G05F 1/575 |
| 2007/0271399 | A1* | 11/2007 | Peng | G06F 3/044 |
| | | | | 710/1 |
| 2008/0036473 | A1* | 2/2008 | Jansson | G06F 3/03547 |
| | | | | 324/678 |
| 2009/0189442 | A1* | 7/2009 | Chi | H04L 25/028 |
| | | | | 307/2 |
| 2012/0229076 | A1* | 9/2012 | Zhu | H04L 25/02 |
| | | | | 320/107 |
| 2014/0266103 | A1* | 9/2014 | Wang | G05F 1/462 |
| | | | | 323/274 |
| 2014/0306673 | A1* | 10/2014 | Le | H02M 3/156 |
| | | | | 323/266 |
| 2015/0177757 | A1* | 6/2015 | Bhattad | G05F 1/573 |
| | | | | 323/281 |
| 2015/0180355 | A1 | 6/2015 | Freeman et al. | |
| 2015/0269112 | A1* | 9/2015 | Hsueh | G06F 13/4072 |
| | | | | 710/106 |
| 2016/0126838 | A1 | 5/2016 | Cavallini et al. | |
| 2016/0218625 | A1 | 7/2016 | Chen | |
| 2016/0241148 | A1* | 8/2016 | Kizilyalli | H05K 5/0247 |
| 2016/0291631 | A1 | 10/2016 | Sen et al. | |
| 2016/0308452 | A1 | 10/2016 | Motoki | |
| 2017/0026167 | A1 | 1/2017 | Gorecki et al. | |
| 2017/0281944 | A1* | 10/2017 | Khalil | A61N 1/3787 |

OTHER PUBLICATIONS

Balestrieri, E., "Digital to Analog Converters: A Metrological Overview," University of Sannio, Department of Engineering, academia.edu [online] published 2004; 6 pages.

International Search Report for International Application No. PCT/US18/20401 dated Jun. 14, 2018; 4 pages.

Written Opinion of the International Searching Authority for International Application No. PCT/US18/20401 dated Jun. 14, 2018; 7 pages.

* cited by examiner

PROGRAMMABLE SHUNT REGULATOR

RELATED APPLICATIONS

This application claims the benefit of U.S. Provisional Application No. 62/508,100, filed on May 18, 2017, the contents of which are hereby incorporated by reference herein.

TECHNICAL FIELD

The disclosure relates to the field of electronic circuits, in particular to a programmable shunt regulator.

BACKGROUND

Electronic circuits may include individual electronic components, such as resistors, transistors, capacitors, inductors, and diodes, among others, connected by conductive wires or traces through which electric current can flow. Electronic circuits may be constructed using discrete components, or more commonly integrated in an integrated circuit where the components and interconnections are formed on a common substrate, such as silicon.

BRIEF DESCRIPTION OF THE DRAWINGS

The disclosure is illustrated by way of example, and not of limitation, in the figures of the accompanying drawings.

DETAILED DESCRIPTION

Figure 1:
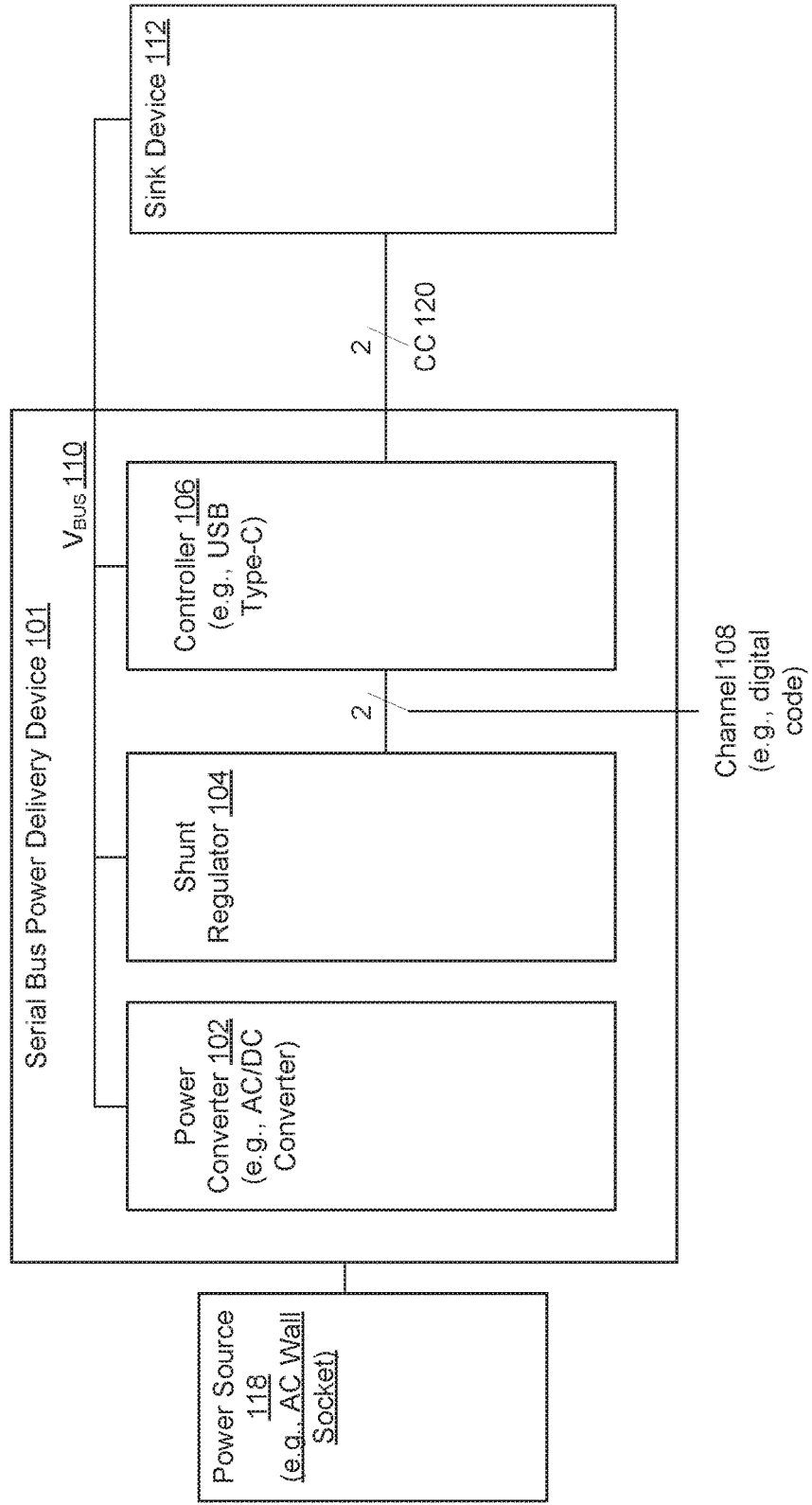
FIG. 1 is a block diagram of a power delivery system 100 (also referred to as "system" herein).

A programmable circuit may be an electronic circuit, such as an integrated circuit (IC) that has multiple components that are reconfigurable to perform various operations or functions. Unlike fixed function circuits, programmable circuits may be programmed (e.g., configured or reconfigured) during operation (e.g., field-programmable, dynamic) or prior to use to execute some functions and not execute other functions. In addition, a programmable circuit may be configured or reconfigured during operation based on the programming of the programmable circuit (e.g., run-time configurable). Programmable circuits may be reprogrammed multiple times to execute different operations and functions.

Application demand has increased the desire for programmable circuits with increased flexibility to support diverse applications. Rather than support some operations with off-chip components, designers are tasked with bringing functionality to programmable circuits to improve performance, cost, meet customer demands, and repurpose functional blocks to perform multiple functions. For example, in some power applications a source device may be requested to provide dynamic programmability to provide an output voltage to a sink device in a range of voltages (e.g., 3 Volts (V) to 22 V) within a defined tolerance (e.g., 5% tolerance) and in small increments or step sizes (e.g., 20 millivolts (mV)).

Aspects of the present disclosure address the above-mentioned and other challenges by providing, a serial bus-compatible power supply device, such as a serial bus power delivery (SBPD) device (also referred to as a "source device" herein) (e.g., universal serial bus (USB™) compatible power supply device) with a shunt regulator having an error amplifier and an current digital-to-analog converter (DAC) that is used to provide dynamic programmability of an output voltage (e.g., Vbus) in response to programmable power supply commands (e.g., universal serial bus-power Deliver™ (USB-PD™) commands) from a sink device that specify the programmable output voltage (and possibly current) to be delivered by the SBPD device.

In some embodiments, a SBPD device may include a controller to receive a programmable power supply command specifying a programmable output voltage to be delivered by the SBPD device. The SBPD device may also include a shunt regulator coupled to the controller. The shunt regulator includes an amplifier with an output, a first input, and a second input. The shunt regulator also includes a current digital-to-analog converter (DAC) with an input and an output. The input of the current DAC is coupled to the controller and receives a digital code from the controller indicative of the programmable power supply command. Responsive to receipt of a digital code from the controller, the current DAC adjusts a sink or a source current delivered at the first input of the amplifier (which may also be coupled to a resistor divider network) to control the programmable output voltage to be delivered by the SBPD device.

FIG. 1 is a block diagram of a power delivery system 100 (also referred to as "system" herein). System 100 includes a serial bus-compatible power supply device 101. An example of a serial bus-compatible power supply device 101 may include a serial bus power deliver (SBPD) device 101 or a USB™-compatible power supply device. It may be noted that serial bus compatible power supply device is referred to SBPD device, herein, for an example. In some embodiments, SBPD device 101 is universal serial bus-power delivery (USB-PD™) device that is compatible with the USB-PD™ standard or more generally with the USB™ standard. For example, SBPD device 101 may be used to provide dynamic programmability of an output voltage, such as Vbus 110, in a range of voltages (e.g., 3 Volts (V) to 22 V) within a defined tolerance (e.g., 5% tolerance) and in small increments (e.g., 20 millivolts (mV)). Dynamic programmability may refer to the ability to program different output voltages while a device is powered. In some embodiments, the current supplied by SBPD device 101 may also be configurable and programmable and support a range of supplied current, such as from 500 milliamps (mA) to 5 Amps (A). It may be noted that voltage bus may refer to the physical connection (e.g., bus) on which Vbus 110 is transmitted.

In embodiments, SBPD device 101 is connected to power source 118. In some embodiments, the power source 118 may be a wall socket power source that provides alternating current (AC) power. In other embodiments, power source 118 may be a different power source, such as a battery, and provide direct current (DC) power to SBPD device 101. Power converter 102 may convert the power received from power source 118. For example, power converter 102 may be an AC/DC converter and convert AC power from power source 118 to DC power. In some embodiments, power converter 102 is a flyback converter, such as an optocoupler-based flyback converter, that provides galvanic isolation between the input (e.g., primary side) and the output (e.g., secondary side).

In embodiments, SBPD device 101 receives a programmable power supply command from sink device 112 via communication channel (CC) 120 specifying a particular output voltage, and possibly an output current. In some embodiments, the programmable power supply command is compatible with the USB-PD™ standard. Controller 106 receives the programmable supply command from sink device 112 via the communication channel 120. In some embodiments, controller 106 is a USB™ Type-C controller compatible with the USB™ Type-C standard. Responsive to receiving the programmable power supply command, controller 106 determines a digital code representative of the requested output voltage and sends the digital code via channel 108 to shunt regulator 104 (also referred to as a "shunt voltage regulator" herein). As will be further described in the following Figures, shunt regulator 104 regulates the programmable output voltage (Vbus 110) responsive to the received digital code. Shunt regulator may regulate Vbus 110 on the voltage bus of a USB™-compatible power supply.

In embodiments, any of the components of SBPD device 101 may be part of an integrated circuit or alternatively any of the components of SBPD device 101 may be implemented in its own integrated circuit. For example, power converter 102, shunt regulator 104, and controller 106 may each be discrete integrated circuits with separate packaging and pin configurations.

In some embodiments, the SBPD device 101 may provide a complete USB Type-C and USB-Power Delivery port control solution for notebooks, dongles, monitors, docking stations, power adapters, and the like.

Figure 2:
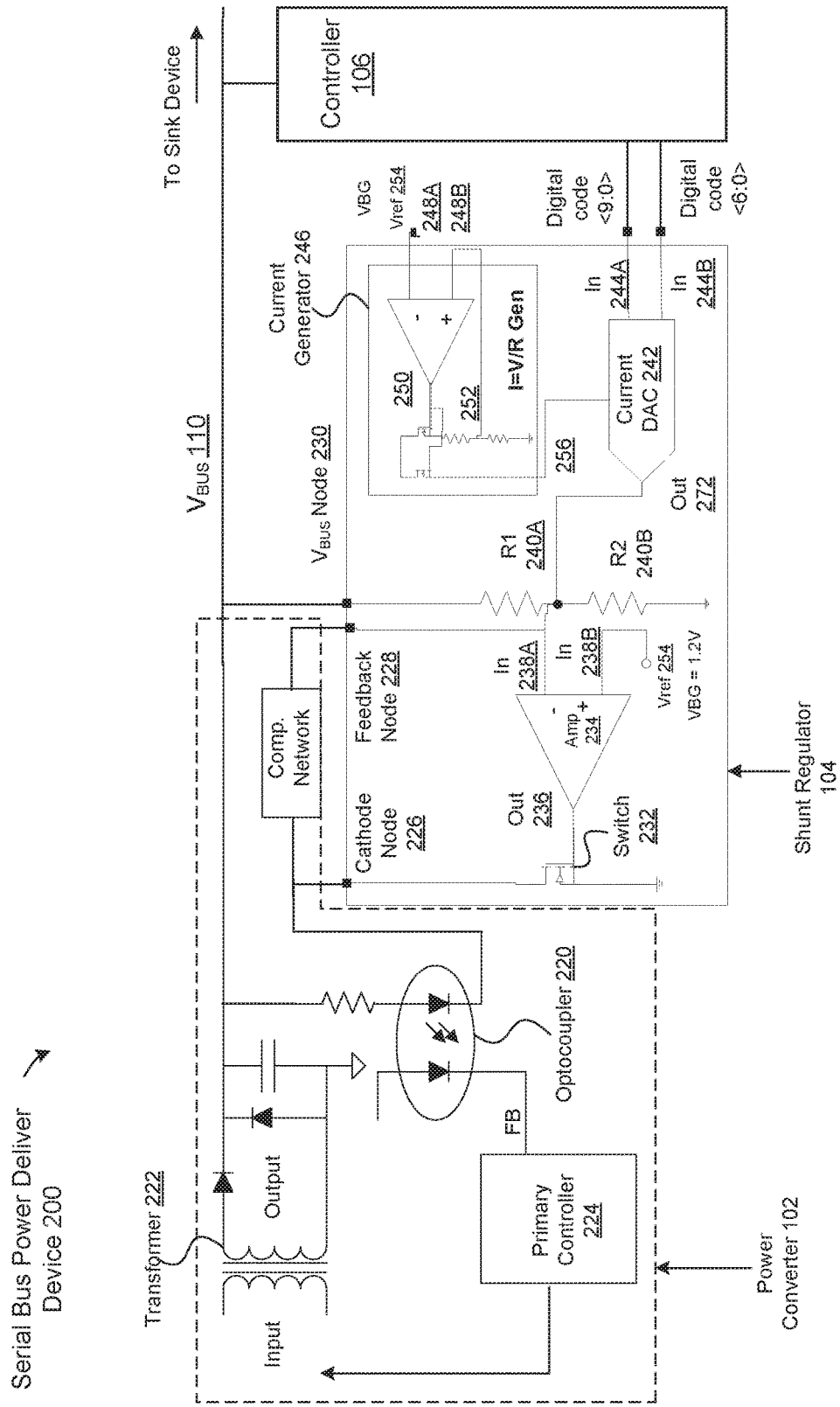
FIG. 2 is a circuit diagram illustrating a power bus power delivery device, according to some embodiments.

FIG. 2 is a circuit diagram illustrating a power bus power delivery device, according to some embodiments. SBPD device 200 may be similar to SBPD device 101 as described with respect to FIG. 1. For the sake of convenience and clarity, numbers of components used in FIG. 1 are used in the present Figure. SBPD device 200 device includes power converter 102, shunt regulator 104, and controller 106. In other embodiments, SBPD device 200 may include the same, more, or fewer components. Shunt regulator 104 is illustrated as a discrete device (e.g., integrated circuit in own package and with ouput pins) for purposes of illustration, rather than limitation.

In embodiments, power converter 102 may be an optocoupler-based flyback converter, as illustrated. As noted above, power converter 102 may be any type of power converter. Power converter 102 includes a transformer 222 that transforms a voltage at the input (e.g., primary), such as rectified AC voltage, to a voltage at the output, such as a DC voltage (e.g., Vbus 110). Primary controller 224 may control the voltage at the output of transformer 222 by, for example, controlling a switching frequency on the primary side. In embodiments, the primary controller 224 may control the switching frequency and duty cycle on the primary side In embodiments, power converter 102 may be coupled to shunt regulator 104 in a closed feedback-loop, as illustrated. For example, shunt regulator 104 senses a voltage at feedback node 228 and shunts current via switch 232. The resultant change in current through cathode 226 is sensed by optocoupler 220. Optocoupler 220 sends a respective signal to primary controller 224. Responsive to the signal from the optocoupler 220, primary controller 224 controls the switching frequency at the input of transformer 222, which adjust the voltage on the output of the transformer 222, i.e., Vbus 110.

In embodiments, and as noted above, controller 106 receives a programmable power supply command from a sink device (not shown). The programmable power supply command may specify a programmable output voltage (i.e., Vbus 110) (and possibly a programmable current) to be delivered by SBPD device 200 to the sink device. Vbus 110 may refer to the programmable output voltage herein, unless otherwise described. Responsive to receiving the programmable power supply command, controller 106 determines an appropriate digital code indicative of requested output voltage (Vbus 110) specified by the programmable power supply command. Controller 106 sends the digital code to the input 244 of current DAC 242 of shunt regulator 104.

In some embodiments, current DAC 242 may include two DACs. As illustrated, current DAC 242 includes two inputs 244A and 244B (collectively referred to as "input 244"), where input 244A may be to the current sink DAC and input 244A may be to the current source DAC. Current DAC 242 may sink or source current at the output 272 of current DAC 242. By sinking current, current DAC 242 may increase Vbus 110 by the resistance of resistor 240A (R1) times the sink current (Isnk). By sourcing current, current DAC 242 may decrease the Vbus 110 by the resistance of resistor 240A (R1) times the source current (Isrc). It may be noted that controller 106 may determine whether to raise or lower Vbus 110 responsive to receiving the programmable power supply command and send the appropriate digital code to the appropriate DAC input 244.

In embodiments, the output 272 of current DAC 242 is coupled to feedback node 228. Feedback node 228 is coupled to the input 238A of amplifier 234 and the series connection point of a resistor network 240 that includes resistor 240A (R1) and resistor 240B (R2) coupled in series.

In embodiments, the operation of shunt regulator 104 may be described as follows. In closed-loop feedback, amplifier 234 controls the voltage at the feedback node 228, which is coupled to input 238A of amplifier 234, to closely match the reference voltage 254 (Vref) coupled to the other input 238B of amplifier 234. As noted above, amplifier 234 control the shunt current from cathode node 226 to a ground potential, which in closed-loop feedback as described above, adjusts Vbus 110. The current across resistor 240B (R2) remains relatively constant, as the voltage at feedback node 228 is maintained around reference voltage 254 (Vref). Responsive to current DAC 242 sinking current and based on holding the voltage at feedback node 228 constant at reference voltage 254 (Vref), the voltage at Vbus node 230 increases by the additional sink current times the resistance of resistor 240A (R1). Similarly, responsive to current DAC 242 sourcing current and based on holding the voltage at feedback node 228 constant at reference voltage 254 (Vref), the voltage at Vbus node 230 decreases by the source current times the resistance of resistor 240A (R1). It may be noted that the source current is supplied across resistor 240B (R2). Since feedback node 228 is held at reference voltage 254 (Vref), less current is supplied at Vbus node 230 and across resistor 240A (R1), which reduces Vbus 110.

In embodiments, current generator 246 sources current to current DAC 242. The current generator includes an input 248A and 248B (collectively referred to as "input 248") and an output 256 that is coupled to current DAC 242. The output 256 of current generator 246 is coupled to current DAC 242 to source current to current DAC 242. Current generator 246 may include an amplifier 250. The amplifier may include an input 248A coupled to reference voltage 254 (Vref), and another input 248B coupled in feedback with the output of the amplifier 250. The current generator 246 includes an internal resistor, such as resistor 252 (R) (which includes both resistors illustrated in the Figure), that is proportionate to an input voltage (reference voltage 254 (Vref)) of the current generator 246 divided by the current delivered to and from current DAC 242 ($I_{source}$=Vref/R).

In some embodiments, the two DACs of current DAC 242 may be an N-bit current sink DAC and M-bit current source DAC, where N and M represent an integer. In one embodiment, the current sink DAC is 10-bit and the current source DAC is 7-bit. It may be noted that the bit number may be selected by a designer pursuant to a desired voltage range and step-size (e.g., increment) desired at Vbus 110. In some embodiments, the current DAC 242 may include one or more current steering DACs. In some embodiments, the current DAC 242 may include one or more thermometric-type DACs. A thermometric-type DAC may receive a digital code and convert the digital code into thermometer code, which is used to drive current cells. In some embodiments, the current DAC 242 may be monotonic, such as a monotonic thermometric DAC. Monotonicity may refer to a property of certain types of DACs. In a monotonic DAC, the analog output increases or remains constant (e.g., does not dip or decrease) as the digital input increases. It may be noted that any combination of the above described DAC may be implemented.

In embodiments, resistor network 240 includes resistor 240A (R1) coupled in series with resistor 240B (R2). The resistor network 240 is supplied by Vbus 110. It may be noted that resistor 240B (R2) is connected from the feedback node 228 to a ground potential, such as a device ground. It may be noted that the ground symbols in the Figures may refer to device ground (e.g., ground of SBPD device 200), unless otherwise described. Resistor 240A (R1) and resistor 240B (R2) may be internal resistors, i.e., formed on a substrate along with the other components of shunt regulator 104. In embodiments, the resistor 240A (R1) and resistor 240B (R2) are non-variable resistors. In embodiments, resistor 240A or 240B are external resistors.

In embodiments, amplifier 234 may be an error amplifier. Amplifier 234 may have gain, such as 60 decibels (dB) of gain. The output of amplifier 234 is coupled to switch 232 and current through the FET responsive to a voltage applied by amplifier 234. In an embodiment, switch 232 is a metal-oxide-semiconductor field-effect transistor (MOSFET) including a gate, a source, and a drain. The gate of the MOSFET is coupled with the output 236 of the amplifier 234, and the source of the MOSFET is coupled to a ground potential. A MOSFET is a type of field-effect transistor (FET) with an insulated gate, whose voltage determines the conductivity of the device. It may be noted that a number of switch devices may be used as switch 232, such as a power MOSFET, Bi-polar Junction Transistor, or other devices.

In embodiments, various techniques may be used to reduce or cancel error (e.g., voltage error on Vbus 110) produced by shunt regulator 104. In one embodiment, resistor variation or error may be canceled or reduced. For example, an internal resistor, such resistor 240A (R1), may have a temperature coefficient that causes the resistance of resistor 240A (R1) to vary upwards of 20%. Since Vbus 110 is dependent on resistor 240A (R1) and the sink and source current, resistance variation in resistor 240A (R1) will show up as a voltage error on Vbus 110. To reduce error cause by resistor 240A (R1), resistor 240A (R1) and the resistor 252 (R) of current generator 246 may be matched. It may be noted that resistor 252 (R) may include the total series resistance of the two resistors shown in the figure. Matching of resistor 240A (R1) with resistor 252 (R) may include layout matching techniques where resistor 240A (R1) are matched both in physical layout and by proximity to one another. For example, both resistor 240A (R1) and resistor 252 (R) may be split into a number of segments, where the segments of the two resistors or overlapped or interwoven. Cancelation of resistor 240A (R1) and resistor 252 (R) may be seen in the following equation: ΔVbus=R1×Isnk where Isink=Vref/R. In embodiments, resistor 252 may be an internal resistor or external resistor.

In some embodiments, variation in reference voltage 254 (Vref) may be reduced or canceled by applying the same reference voltage 254 (Vref) to the input 238B of amplifier 234 and the input 248A of current generator. In some embodiments, reference voltage 254 (Vref) may be a bandgap voltage reference. A bandgap voltage reference may refer to a temperature independent voltage reference that produces a constant voltage regardless of power supply variations, temperature changes, or circuit loading. In some embodiments, the accuracy of a bandgap voltage reference is 1% or less. In some embodiments, the voltage reference to amplifier 234 and amplifier 250 may be different voltage references, such as a non-bandgap voltage.

In embodiments, systematic variations of current DAC 242 may be reduced by using a high-precision DAC, such as a thermometric-type DAC. In some embodiments, systematic errors in the DAC may be reduced by performing a trim operation post-fabrication. For example, the ideal digital codes for two voltages (e.g., 5V and 20V) may be supplied to shunt regulator 104. Vbus 110 may be measured in view of the ideal digital codes. If a Vbus 110 error is measured, the two ideal digital codes may be calibrated to so that the calibrated digital codes may be used to obtain Vbus 110 at the two desired voltages (e.g., 5V and 20V). A calibration equation may be derived from the two voltages and calibrated digital codes, and the remaining digital codes for different voltages may be determined or calibrated using the calibration equation. In other embodiments, more than two voltages may be used to determine the calibration equation.

In embodiments, the shunt regulator 104 may enable the SBPD device 200 to provide Vbus 110 in the range of 3V-22V with 2% tolerance and in increments of 20 mV (e.g., given an ideal power converter 102).

Figure 3:
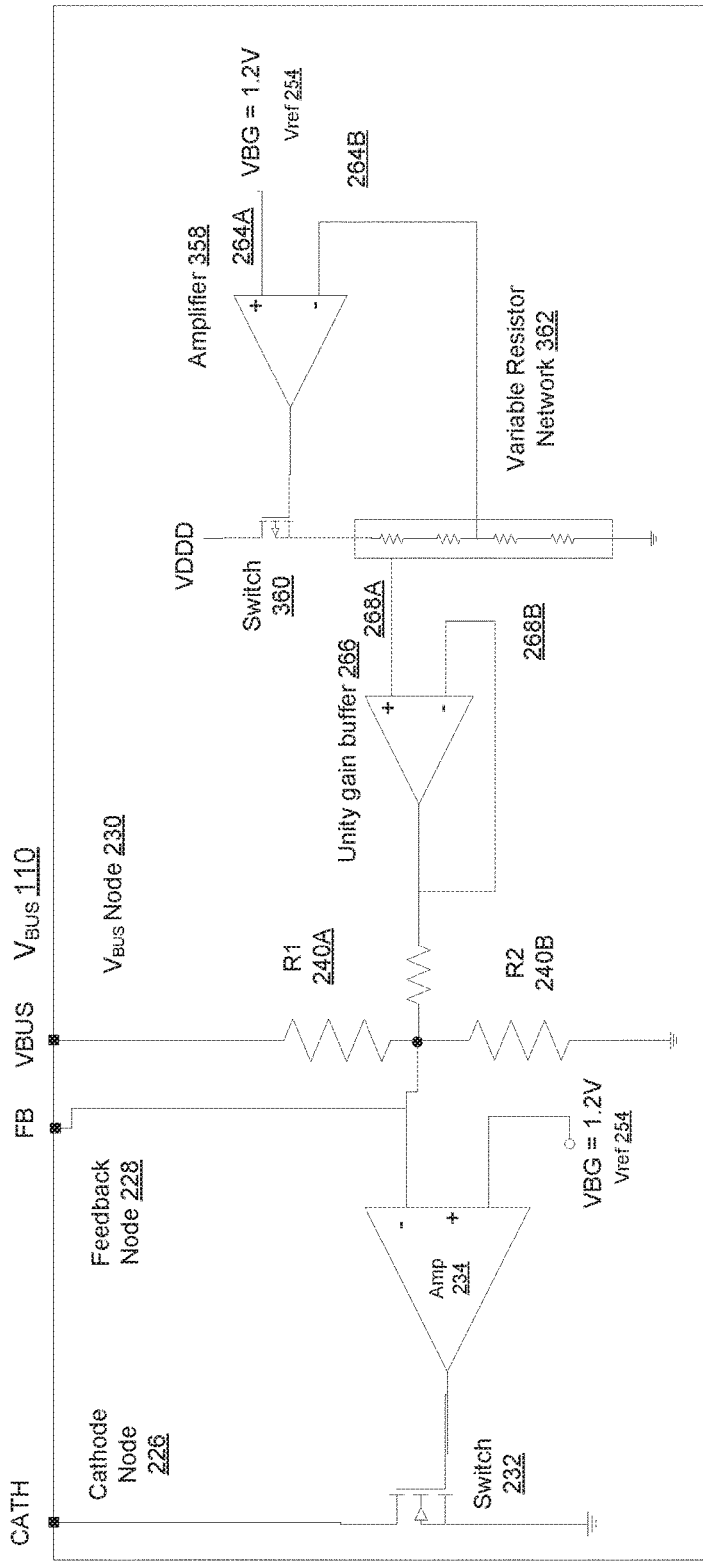
FIG. 3 is a circuit diagram illustrating a shunt regulator, according to some embodiments.

FIG. 3 is a circuit diagram illustrating a shunt regulator, according to some embodiments. Shunt regulator 300 may inlcude some similar components as shunt regulator 104 as described with repsect to FIGS. 1-2. For the sake of convenience and clarity, some components used in FIGS. 1-2 are used in the present Figure.

Conceptually, shunt regulator 300 works similarly to shunt regulator 104 of FIGS. 1-2. The buffer 266, sinks or sources current to the feedback node 228 to adjust Vbus 110. In embodiments, a digital code received by shunt regulator 300 is used to adjust the tap on variable resistor network 362, which adjusts the voltage seen at the input 268A of buffer 266. Responsive to the change in voltage at input 268A of buffer 266, buffer either sinks or sources current to resistor network 240 to adjust Vbus 110.

In embodiments, buffer 266 may be a unity gain buffer. Buffer includes input 268A and 268B (collectively referred to "input 268"). Input 268A of buffer 266 is coupled to variable resistor network 362. Input 268B of buffer 266 is coupled in feedback with the output of buffer 266. In embodiments, amplifier 358 may have input 264A and inputs 264B (collectively referred to as "input 264"). Input 264 of amplifier 358 may be coupled to reference voltage 254 (Vref), which in some embodiments, is the same reference voltage that is coupled to amplifier 234. Input 264B of amplifier 358 is coupled to the variable resistor network 362. As noted above the input 264B connection to variable resistor network 362 may be adjusted responsive to an digital code received from controller 106, for example. The output of amplifier 358 is coupled to MOSFET 360. MOSFET 360 may be similar to switch 232. The source of MOSFET 360 is supplied by an internal regulated voltage (VDDD), a voltage that may be shared by the various components.

Figure 4:
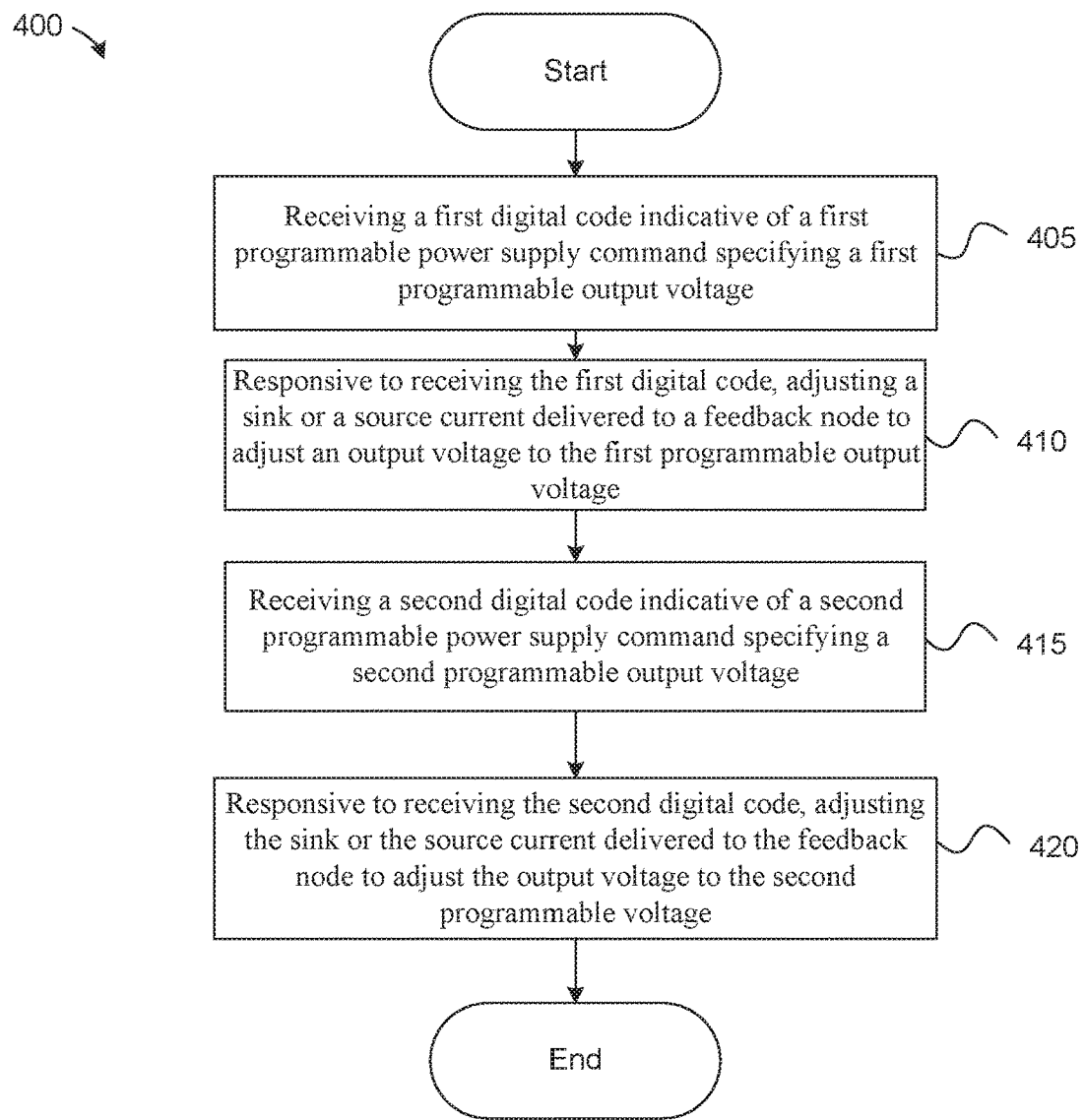
FIG. 4 illustrates a flow diagram of a method of providing a programmable output voltage using a programmable shunt regulator, according to another embodiment.

FIG. 4 illustrates a flow diagram of a method of providing a programmable output voltage using a programmable shunt regulator, according to another embodiment. The method 400 may be performed by processing logic that comprises hardware (e.g., circuitry, dedicated logic, programmable logic, microcode, etc.), software (such as instructions run on a processing device), or a combination thereof. The method 400 may be performed wholly or in part by SBPD device 101, 200, or components thereof. For example, method 400 may be performed by shunt regulator 104 or 300.

Method 400 begins at block 405 where processing logic performing the method receives a first digital code indicative of a first programmable power supply command specifying a first programmable output voltage to be delivered by a serial bus power delivery (SBPD) device. At block 410, processing logic responsive to receiving the first digital code, adjusts a sink or a source current delivered to a feedback node to adjust an output voltage to the first programmable output voltage for dynamic programmability. The feedback node is coupled to a first input of an amplifier of the shunt regulator. At block 415, processing logic receives a second digital code indicative of a second programmable power supply command specifying a second programmable output voltage to be delivered by the SBPD device. At block 420, processing logic responsive to receiving the second digital code, adjusts the sink or the source current delivered to the feedback node to adjust the output voltage to the second programmable voltage.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. A device comprising:
   a shunt regulator of a universal serial bus (USB) compatible power supply device, the shunt regulator comprising:
   an amplifier comprising an output, a first input, and a second input;
   a first resistor comprising a first terminal and a second terminal, wherein the first terminal is coupled to the first input of the amplifier and the second terminal is to couple to a ground potential;
   a current digital-to-analog converter (DAC), coupled to the first input of the amplifier, the first terminal of the first resistor, and a voltage bus node, to adjust at least a sink current applied at the first input of the amplifier to control a programmable output voltage (Vbus) in the USB-compatible power supply device, wherein the sink current applied by the DAC is responsive to receipt of a digital code indicative of a programmable power supply command specifying the Vbus to be delivered by the USB-compatible power supply device on the voltage bus node; and
   a current generator comprising a resistor that is proportional to an input voltage of the current generator with respect to a current delivered to and from the current DAC, wherein the resistor is matched to a second resistor of a resistor network of the shunt regulator, wherein a bandgap voltage is shared between an input of the current generator and the second input of the amplifier, and wherein an output of the current generator is coupled to the current DAC.

2. The device of claim 1, wherein the USB-compatible power supply device and the programmable power supply command is compatible with a universal serial bus-power delivery (USB-PD) standard.

3. The device of claim 1, wherein the shunt regulator further comprises:
   a resistor network comprising the first resistor coupled in series with a second resistor at a feedback node, wherein the resistor network is connected to the first input of the amplifier and an output of current DAC at the feedback node, wherein the resistor network is supplied by the programmable output voltage to be delivered by the USB-compatible power supply device.

4. The device of claim 1, wherein the device further comprises:
   a type-c controller compatible with a USB type-C standard, the type-c controller coupled to the current DAC and to receive the programmable power supply command specifying the Vbus to be delivered by the USB-compatible power supply device.

5. The device of claim 1, wherein the second input of the amplifier is coupled to a reference voltage.

6. The device of claim 1, wherein the current DAC is a monotonic thermometric DAC.

7. The device of claim 1, wherein the current DAC comprises:
   an N-bit current sink DAC; and
   an M-bit current source DAC.

8. A universal serial bus (USB) compatible power supply device, comprising:
   a controller to receive a programmable power supply command specifying a programmable output voltage (Vbus) to be delivered by the USB-compatible power supply device; and
   a shunt regulator coupled to the controller, the shunt regulator comprising:
   an amplifier comprising an output, a first input, and a second input;
   a first resistor comprising a first terminal and a second terminal, wherein the first terminal is coupled to the first input of the amplifier and the second terminal is to couple to a ground potential;
   a current digital-to-analog converter (DAC) comprising an input and an output, wherein the output of the current DAC is coupled to the first input of the amplifier, the first terminal of the first resistor, and a voltage bus node, wherein the input of the current DAC is coupled to the controller, wherein the current DAC to adjust at least a sink current delivered at the first input of the amplifier from the output of the current DAC to control the Vbus in the USB-compatible power supply device, wherein the sink current delivered by the DAC is responsive to receipt of a digital code from the controller indicative of the programmable power supply command specifying the Vbus to be delivered by the USB-compatible power supply device, wherein the programmable output voltage is programmable in a plurality of predefined increments within a voltage range; and
   a current generator comprising a resistor that is proportional to an input voltage of the current generator with respect to a current delivered to and from the current DAC, wherein the resistor is matched to a second resistor of a resistor network of the shunt regulator, wherein a bandgap voltage is shared between an input of the current generator and the second input of the amplifier, and wherein an output of the current generator is coupled to the current DAC.

9. The USB-compatible power supply device of claim 8, further comprising:

a power converter coupled to the shunt regulator.

10. The USB-compatible power supply device of claim 9, wherein the power converter is an optocoupler-based flyback converter.

11. The USB-compatible power supply device of claim 9, wherein the controller is universal serial bus (USB) type-c controller compatible with a USB type-C standard, wherein the USB-compatible power supply device and the programmable power supply command is compatible with a universal serial bus-power delivery (USB-PD) standard.

12. The USB-compatible power supply device of claim 9, wherein the shunt regulator further comprises:

a resistor network comprising the first resistor coupled in series with a second resistor at a feedback node, wherein the resistor network is connected to the first input of the amplifier and an output of current DAC at the feedback node, wherein the resistor network is supplied by the programmable output voltage to be delivered by the USB-compatible power supply device.

13. A method comprising:

receiving, by a current digital-to-analog converter (DAC) of a shunt regulator, a first digital code indicative of a first programmable power supply command specifying a first programmable output voltage (Vbus) to be delivered to a voltage bus of USB-compatible device; and responsive to receiving the first digital code, adjusting, by the current DAC, a sink current delivered to a feedback node to adjust an output voltage to the first Vbus for dynamic programmability, wherein the feedback node is coupled to a first input of an amplifier of the shunt regulator, wherein the first programmable output voltage is programmable from 3 volts to 22 volts within 2% tolerance in increments of 20 millivolts (mV).

14. The method of claim 13, further comprising:

receiving, by the current DAC, a second digital code indicative of a second programmable power supply command specifying a second Vbus to be delivered to a USB-compatible device; and responsive to receiving the second digital code, adjusting, by the current DAC, the sink or a source current delivered to the feedback node to adjust the output voltage to the second Vbus.

15. The method of claim 13, wherein the USB-compatible power supply device and the programmable power supply command is compatible with a universal serial bus-power delivery (USB-PD) standard.

* * * * *